March 10, 1970    J. I. MALJUK ET AL    3,500,392
INDICATOR-CONVERTER
Filed June 14, 1966

United States Patent Office 3,500,392
Patented Mar. 10, 1970

3,500,392
INDICATOR-CONVERTER
Jury Ivanovich Maljuk, Ul. Kharkovskikh divizy, 18/1, kv. 17; Vladimir Georgievich Shidlovsky, Pr. Lenina, 24, kv. 87; and Alexandr Viktorovich Zelinsky, Ul. Dzerzhinskogo, 17, kv. 2, all of Kharkov, U.S.S.R.
Filed June 14, 1966, Ser. No. 557,567
Int. Cl. G09f 9/00, 11/00
U.S. Cl. 340—381    4 Claims

ABSTRACT OF THE DISCLOSURE

An indicator-converter for display of information in which indicating electrodes are placed in an aqueous solution of electrolyte together with at least one common electrode of a chemically inert material which electrically connects the indicating electrodes. The indicating electrodes are constituted of valve metals and have on the surface thereof an oxide layer which possesses the property of changing colors, electrical resistance and potential upon cathode-anode polarization in the electrolyte solution upon passage of electrical signals.

---

The present invention relates to indicating devices for converting signals of electric current, namely, for display, integrating and storage of information in computing technique, television, automatic devices, telemechanics, etc.

Known at present are indicating devices made as indicating elements from which figures, letters, symbols, and other information are synthesized. The functioning of these devices is based upon such known phenomena as electroluminescence, luminescence of gases under the effect of electric discharge, change of electrolyte color under the effect of electric current, and so on.

Each of said devices has its own specific disadvantages.

Thus, for example, the application of electroluminescent indicators is associated with difficulties at fairly intensive external illumination, whereas the use of high supply voltage complicates commutation of said indicators by means of transistorized instruments. Besides, said indicators possesses neither internal memory nor integrating properties.

The indicators in operation thereof utilizes such electrochemical phenomena as changing of electrolyte color have very low speed-response.

An object of the present invention is to eliminate said disadvantages and to provide a reliable indicator-converter being convenient in service, having reasonable cost of operation and designed for display integration and storage of information.

This object is achieved by means of a new indicator-converter comprising indicating electrodes placed into an aqueous solution of electrolyte, said electrodes being made of valve metals on whose surface an oxide layer, is formed possessing a property to reversibly change colors, electric resistance and electrochemical potential in case of cathode-anode polarization in the electrolyte solution under the effect of electric current signals and comprising also at least one common electrode made of a chemically inert material, said electrode being placed into the same aqueous solution of electrolyte and thereby electrically connected with said indicating electrodes.

Figure 1:
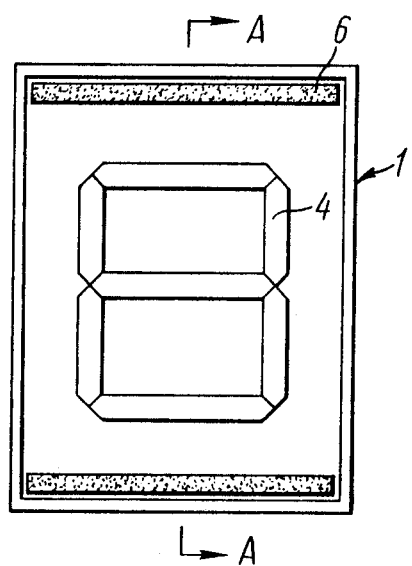
Figure 2:
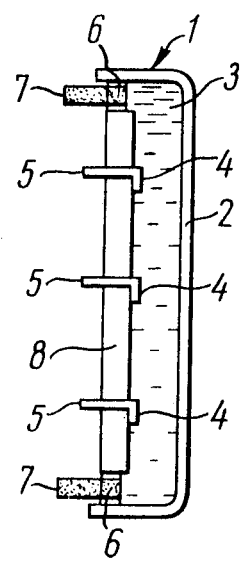

Other objects and advantages of the invention are explained in an exemplary embodiment given hereinbelow of an indicator-converter designed for display of information in black-and-white tones with due reference to the accompanying drawing in which:

FIG. 1 shows the indicator-converter according to the invention (front view); and FIG. 2 is a section taken on the line A—A in FIG. 1.

The indicator-converter according to the invention comprises a housing 1 with a transparent front wall 2, said housing being filled with an aqueous solution of electrolyte 3, indicating electrodes 4 with terminals 5 and common electrodes with terminals 7 disposed on the rear wall 8 which is made of a dielectric material.

The indicating electrodes 4 are made of valve metals on whose surface there is an oxide layer possessing the property of reversible altering of colors, electric resistance and electrochemical potential under the cathode-anode polarization in the solution of electrolyte under the effect of electric current signals. To achieve the specified object of the invention such metals may be used as niobium, titanium and the like on whose surface by means of an anode coating, a light-grey oxide layer is formed which serves for display of information, for example, in black-and-white tones.

The indicating electrodes 4 may be of any size and shape. To attain more contrasting display of information the background of the rear wall 8 of the housing may have the same color as the indicating electrodes.

The common electrodes 6 are made of a chemically inert substance, for example graphite.

As the electrolyte, aqueous current-conducting solutions of salts, acids and alkalis may be used, for example, that of the sulphuric acid.

In order to prevent freezing of the electrolyte at low temperatures an antifreeze, e.g., ethyl alcohol may be introduced thereinto.

The operation of the indicator-converter of the invention proceeds as follows:

After supplying negative current pulses onto the indicating electrodes 4, as a result of electrochemical transformations the oxide layer alters its color from light-grey to black with intermediate half-tones depending upon the amount of the electricity passed. The resistance of the oxide layer decreases also depending upon the amount of electricity passed through and the change of potential of the indicating electrodes.

After a certain amount of electric current has passed, said qualitative and quantitative changes in properties of the said electrodes are sustained within a certain period.

In this way an integral display of information is attained by the change of colors of the indicating electrodes and a simultaneous electronic integration and storage of this information is achieved due to the change of resistance and potential of the indicating electrodes.

During the subsequent supply of positive current pulses onto the indicating electrodes 4 their color returns to the initial light-grey one with intermediate half-tones depending upon the amount of electricity passed through these electrodes, the resistance of the oxide layer of the electrodes increases and their potential is returned to its initial value. Thereby cancellation of information is attained and the indicator-converter is returned into the initial state.

Additionally, information may also be cancelled by closing the indicating and common electrodes through the electric resistance. The current flow in this circuit due to the difference of potentials makes it possible to use the indicator-converter as a generator of current pulses.

In the indicator-converter described, the above-mentioned properties allow production of images of figures from 0 to 9 and to said converter to be employed as a register.

The rapid-response of the indicator-converter proposed herein is a function of the value of voltage which is applied, the resistance and the thickness of the oxide layer on the indicating electrodes, also of the resistance of the electrolyte, the size and shape of the indicating electrodes, the mutual position of the common electrodes and the indicating electrodes.

In order to decrease or increase the information storage time, an oxidizer or a reducer can be respectively introduced into the electrolyte.

As a material for the common electrodes, any porous valve metal may be used such as tantalum, niobium and others whereupon by means of anode coating a dielectric oxide film is formed. This allows limiting the amount of electricity passing through the indicator-converter when displaying the information through the use of the charge of the electrolytic capacitor formed by the indicating and the common electrodes.

The employment of the described indicator-converter for producing images of letters, figures, symbols and the like kinds of information will ensure the required reliability, economy of electric power, simplicity of control circuits, low cost, and small overall dimensions of the instrument, and convenience of reading information in illuminated environment. The instrument is also simple in manufacturing.

Besides, with the help of said instrument for conversion and display of information and with an appropriate implementation of its design, as for instance matrix-type, certain problems may be solved for which other indicating devices cannot be used in such new fields as cybernetic autonetic systems (that is, self-regulation feedback and automatically programmed systems) in information processing by statistical and probability methods, in special-purpose television (small frame flat systems) and also for developing of large-size indicating screens, etc.

The proposed invention may also be employed for daylight advertisement inscriptions.

What is claimed is:

1. An indicator-converter for display of information comprising a body containing an aqueous electrolyte solution; indicating electrodes in said solution, said electrodes being constituted of valve metals and having on the surface thereof an oxide layer which possesses the property to change colors, electrical resistance and potential upon cathode-anode polarization in the electrolyte solution by electrical current signals; and at least one common electrode of a chemically inert material placed into the electrolyte solution and thereby electrically connected to said indicating electrodes.

2. An indicator-converter as claimed in claim 1, wherein the electrolyte solution comprises an oxidizer.

3. An indicator-converter as claimed in claim 1, wherein the electrolyte solution comprises a reducer.

4. An indicator-converter for display of information comprising a body containing an aqueous electrolyte solution; indicating electrodes in said solution, said electrodes being constituted of valve metals and having on the surface thereof an oxide layer possessing the property to change colors, electric resistance and potential upon cathode-anode polarization in the electrolyte solution by electric current signals; and at least one common electrode constituted of a valve metal and having on the surface thereof a dielectric oxide layer, said common electrode being placed in said aqueous electrolyte solution.

References Cited

UNITED STATES PATENTS 3,303,488   2/1967   Anderson _____ 340—324

FOREIGN PATENTS 241,636   10/1925   Great Britain.

THOMAS B. HABECKER, Primary Examiner

C. M. MARMELSTEIN, Assistant Examiner

U.S. Cl. X.R.
40—28; 317—230